(12) United States Patent
Zhao

(10) Patent No.: US 11,321,952 B2
(45) Date of Patent: May 3, 2022

(54) COMPUTER-IMPLEMENTED METHOD OF ALERTING DRIVER OF VEHICLE, APPARATUS FOR ALERTING DRIVER OF VEHICLE, VEHICLE, AND COMPUTER-PROGRAM PRODUCT

(71) Applicant: BOE Technology Group Co., Ltd., Beijing (CN)

(72) Inventor: Jibo Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 237 days.

(21) Appl. No.: 16/494,559

(22) PCT Filed: Apr. 24, 2019

(86) PCT No.: PCT/CN2019/084096
§ 371 (c)(1),
(2) Date: Sep. 16, 2019

(87) PCT Pub. No.: WO2019/228105
PCT Pub. Date: Dec. 5, 2019

(65) Prior Publication Data
US 2021/0326614 A1    Oct. 21, 2021

(30) Foreign Application Priority Data

Jun. 1, 2018    (CN) .......................... 201810556669.7

(51) Int. Cl.
*G06V 20/59*    (2022.01)
*G06T 7/73*    (2017.01)
(Continued)

(52) U.S. Cl.
CPC ......... *G06V 20/597* (2022.01); *G06K 9/6201* (2013.01); *G06K 9/628* (2013.01);
(Continued)

(58) Field of Classification Search
None
See application file for complete search history.

(56) References Cited

U.S. PATENT DOCUMENTS 10,467,488 B2 * 11/2019 Sicconi ................. G06N 20/00
2008/0080741 A1 * 4/2008 Yokoo ............... B60R 21/01538
382/104
(Continued)

FOREIGN PATENT DOCUMENTS

CN    104207791 A    12/2014
CN    104616006 A    5/2015
(Continued)

OTHER PUBLICATIONS

First Office Action in the Chinese Patent Application No. 201810556669.7, dated Mar. 27, 2020; English translation attached.
International Search Report & Written Opinion dated Jul. 25, 2019, regarding PCT/CN2019/084096.
Forth Office Action in the Chinese Patent Application No. 201810556669.7, dated Dec. 23, 2021; English translation attached.

*Primary Examiner* — Vikkram Bali
(74) *Attorney, Agent, or Firm* — Intellectual Valley Law, P.C.

(57) ABSTRACT

A computer-implemented method of alerting a driver of a vehicle is provided. The computer-implemented method includes obtaining a plurality of consecutive input images during a time interval using a three-dimensional depth camera, a respective one of the plurality of consecutive input images comprising a user sub-image and an object sub-image; deriving three-dimensional coordinates of user feature points in the user sub-image of the respective one of the plurality of consecutive input images using a first classifier; deriving three-dimensional coordinates of object feature points in the object sub-image of the respective one of the plurality of consecutive input images using the first classifier; and classifying user posture in the respective one of the plurality of consecutive input images by analyzing the
(Continued)

three-dimensional coordinates of user feature points and the three-dimensional coordinates of object feature points using a second classifier.

20 Claims, 5 Drawing Sheets

(51) Int. Cl.
    *G06K 9/62*     (2022.01)
    *G08B 7/06*     (2006.01)

(52) U.S. Cl.
    CPC .............. *G06K 9/6262* (2013.01); *G06T 7/73* (2017.01); *G08B 7/06* (2013.01); *G06T 2207/10016* (2013.01); *G06T 2207/10028* (2013.01); *G06T 2207/20081* (2013.01); *G06T 2207/20084* (2013.01); *G06T 2207/30201* (2013.01); *G06T 2207/30268* (2013.01)

(56) References Cited

U.S. PATENT DOCUMENTS

| | | | | |
|---|---|---|---|---|
| 2019/0147263 | A1* | 5/2019 | Kuehnle | ............... G07C 5/0808 340/439 |
| 2019/0156204 | A1* | 5/2019 | Bresch | ..................... G06N 3/04 |

FOREIGN PATENT DOCUMENTS

| | | |
|---|---|---|
| CN | 105488957 A | 4/2016 |
| CN | 106485214 A | 3/2017 |
| CN | 106874900 A | 6/2017 |
| CN | 106965675 A | 7/2017 |
| CN | 107341468 A | 11/2017 |
| CN | 107595307 A | 1/2018 |
| CN | 108038453 A | 5/2018 |

* cited by examiner

COMPUTER-IMPLEMENTED METHOD OF ALERTING DRIVER OF VEHICLE, APPARATUS FOR ALERTING DRIVER OF VEHICLE, VEHICLE, AND COMPUTER-PROGRAM PRODUCT

CROSS-REFERENCE TO RELATED APPLICATION

This application is a national stage application under 35 U.S.C. § 371 of International Application No. PCT/CN2019/084096, filed Apr. 24, 2019, which claims priority to Chinese Patent Application No. 201810556669.7, filed Jun. 1, 2018, the contents of which are incorporated by reference in the entirety.

TECHNICAL FIELD

The present invention relates to display technology, more particularly, to a computer-implemented method of alerting a driver of a vehicle, an apparatus for alerting a driver of a vehicle, a vehicle, and a computer-program product.

BACKGROUND

In present, a car becomes an indispensable tool for transportation in people's daily life. However, many reasons may cause a car accident. One of the most important reasons causing a car accident is fatigue driving.

If a driver's fatigue driving status can be detected and the driver can be reminded in time based on his fatigue driving status, the reaction time of the driver will be shortened due to the reminder, resulting in a low chance of having a traffic accident.

SUMMARY

In one aspect, the present invention provides a computer-implemented method of alerting a driver of a vehicle, comprising obtaining a plurality of consecutive input images during a time interval using a three-dimensional depth camera, a respective one of the plurality of consecutive input images comprising a user sub-image and an object sub-image; deriving three-dimensional coordinates of user feature points in the user sub-image of the respective one of the plurality of consecutive input images using a first classifier; deriving three-dimensional coordinates of object feature points in the object sub-image of the respective one of the plurality of consecutive input images using the first classifier; classifying user posture in the respective one of the plurality of consecutive input images by analyzing the three-dimensional coordinates of user feature points and the three-dimensional coordinates of object feature points using a second classifier; determining presence or absence of a gaze position by using a sub-set of the user feature points to define a sub-region and searching for the gaze position in the sub-region; and generating a driver alert signal based on one or a combination of (1) classification of the user posture and (2) the presence or absence of the gaze position.

Optionally, classifying the user posture comprises classifying the user posture into a first type and a second type; and wherein generating the driver alert signal is based on a determination that a first percentage of the plurality of consecutive input images obtained during the time interval determined to be the second type is greater than a first threshold value.

Optionally, generating the driver alert signal is based on a determination that the gaze position is absent in a second percentage of the plurality of consecutive input images obtained during the time interval, the second percentage being greater than a second threshold value.

Optionally, classifying the user posture comprises classifying the user posture into a first type and a second type; generating the driver alert signal is based on a determination that (1) a first percentage of the plurality of consecutive input images obtained during the time interval determined to be the second type is greater than a first threshold value; and (2) the gaze position is absent in a second percentage of the plurality of consecutive input images obtained during the time interval, the second percentage being greater than a second threshold value.

Optionally, determining the presence or absence of the gaze position comprises using the sub-set of the user feature points from a group consisting of a head feature point, a right shoulder feature point, a left shoulder feature point to define the sub-region and searching for the gaze position in the sub-region.

Optionally, the computer-implemented method further comprises pre-training a first initial classifier to obtain the first classifier; wherein pre-training the first initial classifier comprises inputting a plurality of first training images into the first initial classifier, a respective one of the plurality of first training images comprising a user sub-image and an object sub-image; inputting training three-dimensional coordinates of user feature points of user sub-images of the plurality of first training images into the first initial classifier; inputting training three-dimensional coordinates of object feature points of object sub-images of the plurality of first training images into the first initial classifier; deriving three-dimensional coordinates of user feature points in the user sub-images of the plurality of first training images using the first initial classifier; deriving three-dimensional coordinates of object feature points in the object sub-images of the plurality of first training images using the first initial classifier; determining a first degree of match between the training three-dimensional coordinates of the user feature points and the three-dimensional coordinates of the user feature points determined by the first initial classifier; determining a second degree of match between the training three-dimensional coordinates of the object feature points and the three-dimensional coordinates of the object feature points determined by the first initial classifier, and tuning the first initial classifier based on the first degree of match and the second degree of match.

Optionally, the computer-implemented method further comprises pre-training a second initial classifier to obtain the second classifier; wherein pro-training the second initial classifier comprises inputting a plurality of second training images into the second initial classifier, a respective one of the plurality of second training images comprising a user sub-image and an object sub-image; inputting training classified types respectively for the plurality of second training images into the second initial classifier, the classified types comprising a first type and a second type; inputting training three-dimensional coordinates of user feature points of user sub-images of the plurality of second training images into the second initial classifier; inputting training three-dimensional coordinates of object feature points of object sub-images of the plurality of second training images into the second initial classifier; classifying user postures in the plurality of second training images by analyzing the training three-dimensional coordinates of the user feature points and the three-dimensional coordinates of object feature points using the second initial classifier; determining a degree of match between the training classified types and results of classifying the user postures using the second initial classifier, and tuning the second initial classifier based on the degree of match.

Optionally, the first classifier is selected from a group consisting of a random forest classifier, a convolutional neural network classifier, an Adaboost classifier, and an SVM classifier.

Optionally, the second classifier is selected from a group consisting of a random forest classifier, a convolutional neural network classifier, Adaboost classifier, and an SVM classifier.

Optionally, the user sub-image comprises an image of an upper body of the driver and the object sub-image comprises an image of a driving wheel of the vehicle.

In another aspect, the present invention provides an apparatus for alerting a driver of a vehicle, comprising an image capturing device configured to obtaining a plurality of consecutive input images during a time interval using a three-dimensional depth camera, a respective one of the plurality of consecutive input images comprising a user sub-image and an object sub-image; a memory; one or more processors; wherein the memory and the one or more processors are connected with each other, and the memory stores computer-executable instructions for controlling the one or more processors to derive three-dimensional coordinates of user feature points in the user sub-image of the respective one of the plurality of consecutive input images using a first classifier, derive three-dimensional coordinates of object feature points in the object sub-image of the respective one of the plurality of consecutive input images using the first classifier; classify user posture in the respective one of the plurality of consecutive input images by analyzing the three-dimensional coordinates of user feature points and the three-dimensional coordinates of object feature points using a second classifier; determine presence or absence of a gaze position by using a sub-set of the user feature points to define a sub-region and searching for the gaze position in the sub-region; and generate a driver alert signal based on one or a combination of (1) classification of the user posture and (2) the presence or absence of the gaze position.

Optionally, the memory stores computer-executable instructions for controlling the one or more processors to classify the user posture into a first type and a second type; and generate the driver alert signal is based on a determination that a first percentage of the plurality of consecutive input images obtained during the time interval determined to be the second type is greater than a first threshold value.

Optionally, the memory stores computer-executable instructions for controlling the one or more processors to generate the driver alert signal based on a determination that the gaze position is absent in a second percentage of the plurality of consecutive input images obtained during the time interval, the second percentage being greater than a second threshold value.

Optionally, the memory stores computer-executable instructions for controlling the one or more processors to classify the user posture into a first type and a second type; and generate the driver alert signal is based on a determination that (1) a first percentage of the plurality of consecutive input images obtained during the time interval determined to be the second type is greater than a first threshold value; and (2) the gaze position is absent in a second percentage of the plurality of consecutive input images obtained during the time interval, the second percentage being greater than a second threshold value.

Optionally, the memory stores computer-executable instructions for controlling the one or more processors to determine the presence or absence of the gaze position using the sub-set of the user feature points from a group consisting of a head feature point, a right shoulder feature point, a left shoulder feature point to define the sub-region and searching for the gaze position in the sub-region.

Optionally, the first classifier is selected from a group consisting of a random forest classifier, a convolutional neural network classifier, an Adaboost classifier, and an SVM classifier.

Optionally, the second classifier is selected from a group consisting of a random forest classifier, a convolutional neural network classifier, an Adaboost classifier, and an SVM classifier.

Optionally, the user sub-image comprises an image of an upper body of the driver and the object sub-image comprises an image of a driving wheel of the vehicle.

In another aspect, the present invention provides a vehicle, comprising the apparatus for alerting a driver of a vehicle described herein.

In another aspect, the present invention provides a computer-program product comprising a non-transitory tangible computer-readable medium having computer-readable instructions thereon, the computer-readable instructions being executable by a processor to cause the processor to perform deriving three-dimensional coordinates of user feature points in a user sub-image of a respective one of a plurality of consecutive input images using a first classifier, the plurality of consecutive input images being obtained during a time interval using a three-dimensional depth camera, the respective one of the plurality of consecutive input images comprising the user sub-image and an object sub-image; deriving three-dimensional coordinates of object feature points in the object sub-image of the respective one of the plurality of consecutive input images using the first classifier; classifying user posture in the respective one of the plurality of consecutive input images by analyzing the three-dimensional coordinates of user feature points and the three-dimensional coordinates of object feature points using a second classifier; determining presence or absence of a gaze position by using a sub-set of the user feature points to define a sub-region and searching for the gaze position in the sub-region; and generating a driver alert signal based on one or a combination of (1) classification of the user posture and (2) the presence or absence of the gaze position.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
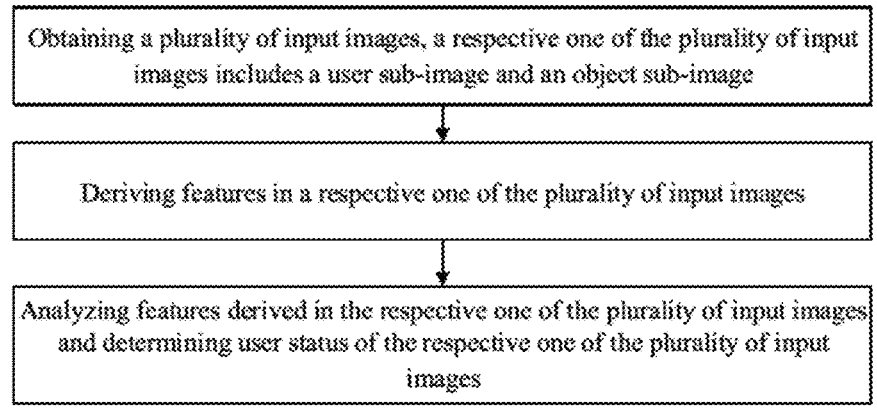
FIG. 1 is a flow chart illustrating a computer-implemented method of processing an image in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is discovered in the present disclosure that the process of deriving three-dimensional coordinates of the prominent physical human body parts (e.g. joints of human body) in conventional methods focuses only on the posture of a human body, especially a whole picture of a human body, and completely ignores the aspect of the interaction between a human body and an object. It is discovered in the present disclosure that the conventional method is not capable of correctly deriving three-dimensional coordinates of an upper body of a driver in an image containing only the upper body image of the driver. For example, when a driver's upper body image is processed using the conventional ways, the three-dimensional coordinates of prominent physical human body parts in the driver's upper body image cannot be derived. The attempt to derive the three-dimensional coordinates of prominent physical human body parts only results in disordered coordinates. Moreover, the driver's hands are in direct contact with the driving wheel, the driving wheel may be misidentified as a part of the driver's body, which may adversely affect the analysis.

Accordingly, the present disclosure provides, inter alia, a computer-implemented method of alerting a driver of a vehicle, an apparatus for alerting a driver of a vehicle, a vehicle, and a computer-program product that substantially obviate one or more of the problems due to limitations and disadvantages of the related art. In one aspect, the present disclosure provides a computer-implemented method of alerting the driver of the vehicle. In some embodiments, the computer-implemented method of alerting the driver of the vehicle includes obtaining a plurality of consecutive input images during a time interval using a three-dimensional depth camera, a respective one of the plurality of consecutive input images including a user sub-image and an object sub-image; deriving three-dimensional coordinates of user feature points in the user sub-image of the respective one of the plurality of consecutive input images using a first classifier, deriving three-dimensional coordinates of object feature points in the object sub-image of the respective one of the plurality of consecutive input images using the first classifier; classifying user posture in the respective one of the plurality of consecutive input images by analyzing the three-dimensional coordinates of user feature points and the three-dimensional coordinates of object feature points using a second classifier, determining presence or absence of a gaze position by using a sub-set of the user feature points to define a sub-region and searching for the gaze position in the sub-region; and generating a driver alert signal based on one or a combination of (1) classification of the user posture and (2) the presence or absence of the gaze position.

In another aspect, the present disclosure also provide a computer-implemented method of processing an image. FIG. 1 is a flow chart illustrating a computer-implemented method of processing an image in some embodiments according to the present disclosure. Referring to FIG. 1, in some embodiments, a computer-implemented method of processing an image includes obtaining a plurality of input images. Optionally, a respective one of the plurality of input images includes a user sub-image and an object sub-image.

Optionally, the plurality of input images are obtained during a time interval using a three-dimensional depth camera, e.g. an RGB-D camera. Various types of three-dimensional depth cameras can be used for obtaining the plurality of input images. Examples of types of three-dimensional depth cameras include, but are not limited to a type of cameras based on structured light, a type of cameras based on time of flight (TOF), and a type of cameras based on stereo system. Optionally, the plurality of input images are obtained during a time interval using a camera other than a three-dimensional depth camera.

Optionally, the user sub-image includes an image of an upper body of the driver. Optionally, the object sub-image includes an image of an object in contact with the user, for example, an image of a driving wheel of the vehicle.

Optionally, the plurality of input images are a plurality of consecutive input images. A respective one of the plurality of consecutive input images includes the user sub-image and the object sub-image.

In order to have a more accurate result, the plurality of consecutive input images are continuously shot by the three-dimensional depth camera within a time interval. In one example, the plurality of consecutive input images are obtained in a frequency of three frames per second. In another example, the plurality of consecutive input images are obtained in a frequency of six frames per second.

In order to have a more accurate result, the user's status information can be determined by analyzing a respective one of the plurality of consecutive input images.

In some embodiments, the computer-implemented method of processing the image includes deriving features in a respective one of the plurality of input images. Optionally, the features include user features and object features. Optionally, the user features are derived from the user sub-image of the respective one of the plurality of consecutive input images, and the object features are derived from the object sub-image of the respective one of the plurality of consecutive input images.

Optionally, a respective one of the features is one or a combination of a feature showing the user's behavior, a feature showing a status of the object. Optionally, a respective one of the features is one or a combination of a point, a line, a shape or a color.

Optionally, the user features are user feature points including user's joint points. Optionally, the object features are object feature points including structural points of the object.

Optionally, the features are derived from the respective one of the plurality of input images using a first classifier.

Various appropriate classifier may be used as the first classifier. Examples of classifier suitable to be used as the first classifier include, but are not limited to, classifiers based on machine learning such as a random forest classifier, a convolutional neural network, an Adaboost classifier, and an SVM classifier.

Optionally, the decision tree classifier can be used for deriving features in the respective one of the plurality of input images. For example, the random forest classifier can be used for deriving features in the respective one of the plurality of input images.

In some embodiments, the computer-implemented method of processing the image includes analyzing features derived from the respective one of the plurality of input images; and determining user status of the respective one of the plurality of input images.

Optionally, subsequent to deriving user features in the user sub-image of the respective one of the plurality of input images, and deriving object features in the object sub-image of the respective one of the plurality of input images, the user status of the respective one of the plurality of input images is determined based on the user features and the object features.

Optionally, the user status includes status at which the user is distracted, status at which user's hands leave the driving wheel, status at which user is not sitting up straight.

Optionally, analyzing features derived from the respective one of the plurality of input images and determining user status of the respective one of the plurality of input images can be performed using a second classifier.

Various appropriate classifier may be used as the second classifier. Examples of classifier suitable to be used as the second classifier include, but am not limited to, classifiers based on machine learning such as a random forest classifier, a convolutional neural network, an Adaboost classifier, an SVM classifier, a kNN classifier, and a k-means classifier.

In some embodiment, the second classifier is a convolutional neural network. For example, in pre-training a convolutional neural network, the training user features and training object features of a respective one of a plurality of training images, and the training user status of the respective one of the plurality of training images are input in an input layer of the initial convolutional neural network. The user status of the respective one of the plurality of training images is output from an output layer of the initial convolutional neural network. Tuning the parameters of the initial convolutional neural network based on the training user features and training object features of a respective one of a plurality of training images, the training user status and the user status of the respective one of the plurality of training images to obtain a convolutional neural network.

In some embodiments, subsequent to obtaining a convolutional neural network, the user features and object features of the respective one of the plurality of input images is input into the convolutional neural network. Optionally, inputting the user features and object features of the respective one of the plurality of input images into the convolutional neural network includes vectorizing the respective one of the plurality of input images having the user features and object features to have the respective one of the plurality of vectorized input images, and inputting the respective one of the plurality of vectorized input images into the convolutional neural network.

Optionally, subsequent to inputting the user features and object features of the respective one of the plurality of input images into the convolutional neural network, a hidden layer of the convolutional neural network analyzes the user features and object features of the respective one of the plurality of input images. An output layer of the convolutional neural network outputs an analysis on the user status of the respective one of the plurality of input images. Optionally, the output further includes ranking of the classification results and a probability of a user status being classified as a certain type.

Optionally, the output layer of the convolutional neural network includes classifier selected from a group consisting of a logistic regression (LR) classifier, a SoftMax classifier, and an SVM classifier.

The computer-implemented method of processing the image includes respectively analyzing the user sub-image and the object sub-image to separate the user sub-image from the object sub-image, which avoids the influence of the object on the determination of user status, reduces error rate of the determination of user status, and enhances accuracy of the determination of user status.

In some embodiments, the computer-implemented method of processing the image further includes determining whether the user is at a to-be-alerted status based on the user status. For example, the to-be-alerted status includes a status of the user having his hand off the driving wheel, and a status of the user having his eyes blinking frequently.

In some embodiments, the computer-implemented method of processing the image further generating a driver alert signal based on the to-be-alerted status, for example, the driver alert signal is generated based on the user status of the respective one of the plurality of input images.

Optionally, when the number of input images having a second type of user status among the plurality of input images exceeds a threshold number, the driver alert signal is given to the user. For example, the second type of the user status is a careless driving type. The number of input images having a careless driving type (e.g. frequently blinking eyes, having hands off the driving wheel) among the plurality of input images exceeds S frames among 8 frames of input images, the driver alert signal is given to the user.

Optionally, when the ratio of the number of input images having a second type of user status among the plurality of input images to the number of the plurality of input images exceeds a threshold value, the driver alert signal is given to the user. For example, when the ratio of the number of input images having a careless driving type (e.g. frequently blinking eyes, having hands off the driving wheel) among the plurality of input images to the number of the plurality of input images exceeds ½, the driver alert signal is given to the user.

Various appropriate methods may be used for giving the driver alert signal. Examples of methods suitable for giving the driver alter signal include, but are not limited to, using whistle signals, using visual signals, using voice signals. For example, the visual signals include LED signals, and signals displayed by screen.

Figure 2:
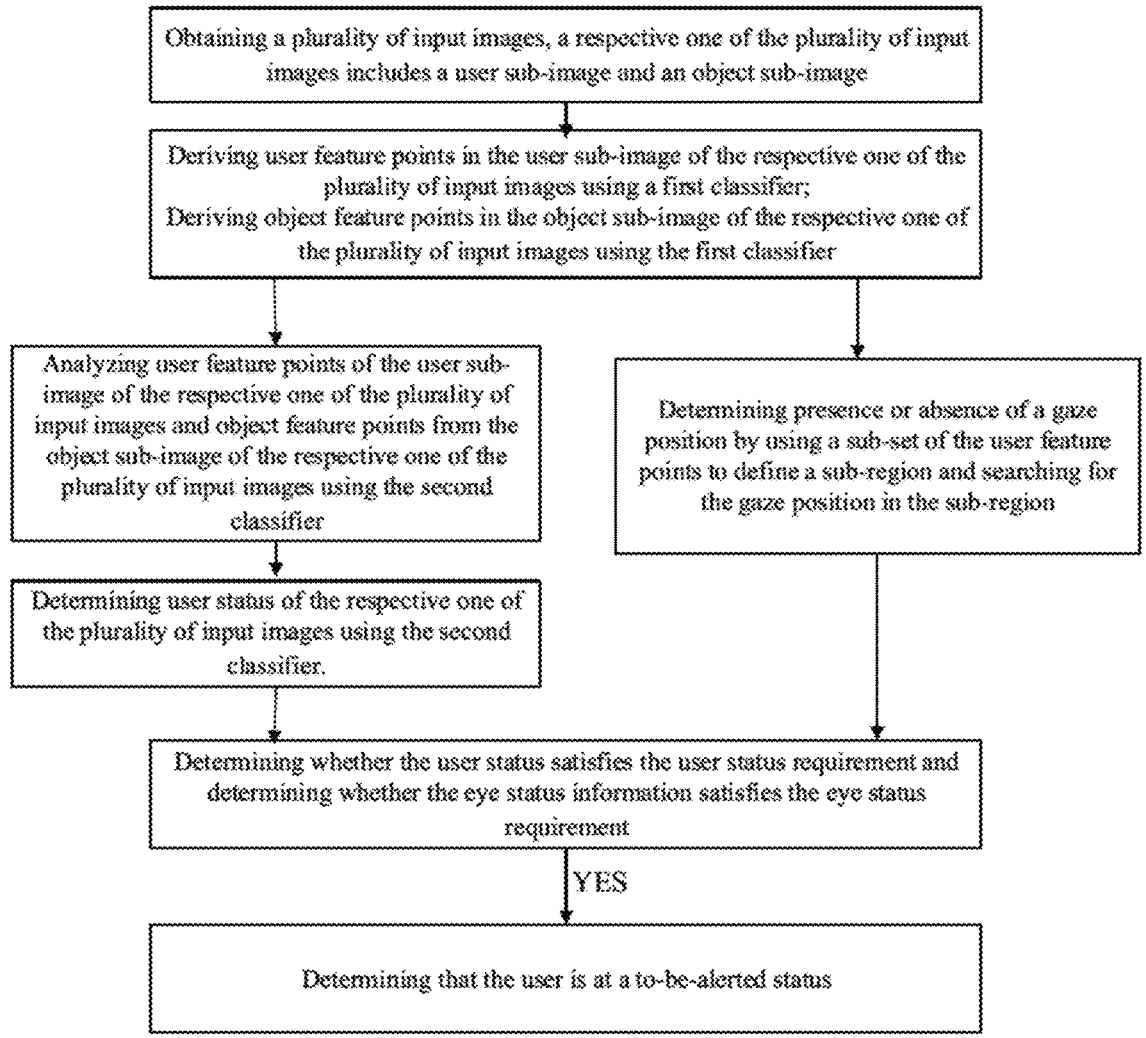
FIG. 2 is a flow chart illustrating a computer-implemented method of processing an image in some embodiments according to the present disclosure.

FIG. 2 is a flow chart illustrating a computer-implemented method of processing an image in some embodiments according to the present disclosure. Referring to FIG. 2, in some embodiments, a computer-implemented method of processing an image includes obtaining a plurality of input images. Optionally, a respective one of the plurality of input images includes a user sub-image and an object sub-image.

Optionally, the plurality of input images are obtained during a time interval using a three-dimensional depth camera, e.g. an RGB-D camera. Various types of three-dimensional depth cameras can be used for obtaining the plurality of input images. Examples of types of three-dimensional depth cameras include, but are not limited to a type of cameras based on structured light, a type of cameras based on time of flight (TOF), and a type of cameras based on stereo system. Optionally, the plurality of input images are obtained during a time interval using a camera other than a three-dimensional depth camera.

Optionally, the user sub-image includes an image of an upper body of the driver. Optionally, the object sub-image includes an image of the object in contact with the driver, for example, an image of a driving wheel of the vehicle.

Optionally, the plurality of input images are a plurality of consecutive input images. A respective one of the plurality of consecutive input images includes the user sub-image and the object sub-image.

In order to have a more accurate result, the plurality of consecutive input images are continuously shot by the three-dimensional depth camera within a time interval. In one example, the plurality of consecutive input images are obtained in a frequency of three frames per second. In another example, the plurality of consecutive input images are obtained in a frequency of six frames per second.

In order to have a more accurate result, the user's status information can be determined by analyzing a respective one of the plurality of consecutive input images.

In some embodiments, the computer-implemented method of processing the image includes deriving user feature points in the user sub-image of the respective one of the plurality of input images using a first classifier based on machine learning; and deriving object feature points in the object sub-image of the respective one of the plurality of input images using the first classifier.

Optionally, the first classifier processes the respective one of the plurality of input images to obtain three-dimensional coordinates of the user feature points and three-dimensional coordinates of the object feature points of the respective one of the plurality of input images.

Various appropriate classifier may be used as the first classifier. Examples of classifier suitable to be used as the first classifier include, but are not limited to, classifiers based on machine learning such as a random forest classifier, a convolutional neural network, an Adaboost classifier, and an SVM classifier.

Optionally, the decision tree classifier can be used for deriving the user feature points and the object feature points in the respective one of the plurality of input images. For example, the random forest classifier can be used for deriving the user feature points and the object feature points in the respective one of the plurality of input images.

In some embodiments, the computer-implemented method of processing the image includes pre-training a first initial classifier to obtain the first classifier. Optionally, pre-training the first initial classifier includes inputting a plurality of first training images into the first initial classifier, a respective one of the plurality of first training images including a user sub-image and an object sub-image; inputting training user feature points of user sub-images of the plurality of first training images into the first initial classifier; inputting training object feature points of object sub-images of the plurality of first training images into the first initial classifier; deriving the user feature points in the user sub-images of the plurality of first training images using the first initial classifier; deriving the object feature points in the object sub-images of the plurality of first training images using the first initial classifier; determining a first degree of match between the training user feature points and the user feature points determined by the first initial classifier; determining a second degree of match between the training object feature points and the object feature points determined by the first initial classifier; tuning the first initial classifier based on the first degree of match and the second degree of match.

Optionally, the plurality of first training images are obtained by three-dimensional depth cameras installed in vehicles (e.g. cars). Optionally, a respective one of the plurality of first training images includes an image of an upper body of a driver. Optionally, the training user feature points of user sub-images and the training object feature points of object sub-images of the plurality of first training images is manually derived.

Optionally, the plurality of first training images are obtained from industry-wide databases, including Motor-Mark databases (imagelab.ing.unimore.it/imagelab).

Optionally, the number of the plurality of first training images is determined by the user. For example, the number of the plurality of first training images is 100, 130, 200, or etc. The greater the number of the plurality of first training images is, the more accurate the first classifier is.

Optionally, the plurality of first training images are standard images subject to the requirement of the first classifier. Optionally, subsequent to selecting the plurality of first training images from a training image database, the training user feature points of the user sub-image of the respective one of the plurality of first training images are derived, and the training object feature points of the object sub-image of the respective one of the plurality of first training images are derived. Optionally, the user feature points and the object feature points are derived based on conventional knowledge or based on cluster analysis.

Figure 2A:
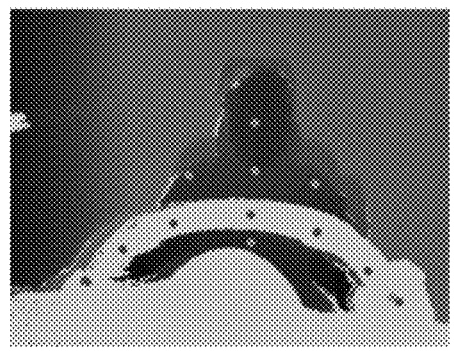
FIG. 2A is a schematic diagram of feature points in an image in some embodiments according to the present disclosure.

FIG. 2A is a schematic diagram of feature points in an image in some embodiments according to the present disclosure. Referring to FIG. 2A, optionally, the training user feature points include, but are not limited to, a right hand feature point, a left hand feature point, a right elbow feature point, a left elbow feature point, a right shoulder feature point, a left shoulder figure point, a head feature point, a neck feature point, and a middle spine feature point.

Optionally, the training object feature points include, but are not limited to, a leftmost driving wheel feature point, a second to the leftmost driving wheel feature point, a third to the leftmost driving wheel feature point, a center driving wheel feature point, a third to the rightmost driving wheel feature point, a second to the rightmost driving wheel feature point, and a rightmost driving wheel feature point, which are arranged along a clockwise direction or a counter clockwise direction. Optionally, the object feature points are evenly distributed in the arc part of the driving wheel along a clockwise direction or a counter clockwise direction.

The training user feature points and the training object feature points shown in FIG. 2A may help to speed up the subsequent process, and help to determine the user status accurately.

In some embodiment, the first initial classifier is a random forest classifier. In the process of pre-training the first initial classifier (e.g. the random forest classifier), subsequent to derive the training user feature points of user sub-images of the plurality of first training images and the training object feature points of object sub-images of the plurality of first training images, the plurality of first training images is input in the first initial classifier (e.g. the random forest classifier), a decision tree is formed based on the training user feature points and the training object feature points. Repeating the process of forming the decision tree to form more decision trees, and to form multiple layers of decision trees, and to finally form a decision tree forest.

In some embodiments, the computer-implemented method of processing the image includes analyzing user feature points of the user sub-image of the respective one of the plurality of input images and object feature points of the object sub-image of the respective one of the plurality of input images using the second classifier, determining user status of the respective one of the plurality of input images using the second classifier.

In some embodiments, the computer-implemented method of processing the image further includes pre-training a second initial classifier to obtain the second classifier.

In some embodiments, pre-training the second initial classifier includes inputting a plurality of second training images into the second initial classifier. Optionally, a respective one of the plurality of second training images includes a user sub-image and an object sub-image.

In some embodiments, pre-training the second initial classifier includes inputting training classified types respectively for the plurality of second training images into the second initial classifier. Optionally, the types of user status are corresponding to the interaction between the user and the object.

Optionally, the classified types includes at least two types of user status. For example, the classified types include a first type and a second type. For example, the first type is a normal driving type. The second type is an abnormal driving type. Optionally, the types of user status include more than two types. For example, the types of user status include a normal driving type, a driving type with hands on the driving wheel, a driving type with hands off the driving wheel, a driving type with normal seated driver, a driving type with abnormal seated driver, a fatigue driving type, and a distracted driver type.

In some embodiments, pre-training the second initial classifier includes inputting training classified types respectively for the plurality of second training images into the second initial classifier, the classified types including a first type and a second type; inputting training three-dimensional coordinates of user feature points of user sub-images of the plurality of second training images into the second initial classifier, inputting training three-dimensional coordinates of object feature points of object sub-images of the plurality of second training images into the second initial classifier; classifying user status in the plurality of second training images by analyzing the training three-dimensional coordinates of the user feature points and the training three-dimensional coordinates of object feature points using the second initial classifier to have results of classifying the user status; determining a degree of match between the training classified types and results of classifying the user status using the second initial classifier; and tuning the second initial classifier based on the degree of match.

Various appropriate neural networks can be used as the second classifier. Example of neural networks suitable to be used as the second classifier includes convolutional neural networks, deep neural networks, and shallow neural network.

In some embodiments, the second classifier is a convolutional neural network. Optionally, the training three-dimensional coordinates of user feature points of the user sub-image of the respective one of the plurality of second training images and the training three-dimensional coordinates of object feature points of the object sub-image of the respective one of the plurality of second training images, training classified types respectively for the plurality of second training images form feature vector matrixes of the respective one of the plurality of second training images. The feature vector matrixes of the respective one of the plurality of second training images are input into the second initial classifier (e.g. the convolutional neural network). Optionally, the second initial classifier (e.g. the convolutional neural network) outputs a respective type of user status of the respective one of the plurality of second training images. So, the second classifier obtained through training the second initial classifier can classify the type of user status of a respective one of the plurality of input images.

Optionally, the plurality of second training images are obtained by three-dimensional depth cameras installed in vehicles (e.g. cars). Optionally, a respective one of the plurality of second training images includes an image of an upper body of a driver. Optionally, the training user feature points of user sub-images and the training object feature points of object sub-images of the plurality of second training images is manually derived.

Optionally, the plurality of second training images are obtained from industry-wide databases, including Motor-Mark databases.

Optionally, the number of the plurality of second training images is determined by the user. For example, the number of the plurality of second training images is 100, 200, 300, or etc. The greater the number of the plurality of second training images is, the more accurate the second classifier is.

In some embodiments, the plurality of first training images respectively corresponds to the plurality of second training images. Optionally, the plurality of first training images can be used as the plurality of second training images. For example, the plurality of first training image can be used to train the first classifier, and can also be used to train the second classifier as well.

In some embodiments, the computer-implemented method of processing the image includes determining presence or absence of a gaze position by using a sub-set of the user feature points to define a sub-region and searching for the gaze position in the sub-region. Optionally, determining presence or absence of a gaze position includes defining the sub-region using the sub-sequent of the user feature points; and searching for the gaze position in the sub-region to determine presence or absence of the gaze position.

Optionally, subsequent to deriving user feature points in the user sub-image of the respective one of the plurality of input images, and deriving object feature points in the object sub-image of the respective one of the plurality of input images using the first classifier. Optionally, the three-dimensional coordinates of the user feature points in the user sub-image of the respective one of the plurality of input images and the three-dimensional coordinates of the object feature points in the object sub-image of the respective one of the plurality of input images can also be derived using the first classifier.

In some embodiments, in the process of defining the sub-region using the sub-set of the user feature points, a sub-set of the three-dimensional coordinates of the user feature points in the user sub-image of the respective one of the plurality of input images are used to define the sub-region.

Optionally, the plurality of input images are obtained using the three-dimensional depth camera. For example, the user sub-image of the respective one of the plurality of input images obtained by the three-dimensional depth camera includes depth information and RGB information.

Optionally, using the sub-set of the user features points of the user sub-image of the respective one of the plurality of input images to define the sub-region of the user sub-image of the respective one of the plurality of input images can reduce the scope of searching the gaze position and enhance the efficiency of searching the gaze position.

Optionally, the sub-region of the user sub-image of the respective one of the plurality of input images can be defined based on the left shoulder feature point and right shoulder feature point derived from the user sub-image.

In one example, the sub-region of the user sub-image of the respective one of the plurality of input images is a sub-region above a line connecting the left shoulder feature point and right shoulder feature point of the user sub-image.

In another example, the sub-region of the user sub-image of the respective one of the plurality of input images has a rectangular shape. A width of the sub-region of the user sub-image of the respective one of the plurality of input images substantially coincident with the line connecting the left shoulder feature point and right shoulder feature point of the user sub-image. The height of the sub-region of the user sub-image of the respective one of the plurality of input images is in a range of 0.6 times to 1.2 times of a length of the line connecting the left shoulder feature point and right shoulder feature point of the user sub-image. Alternatively, the height of the sub-region of the user sub-image of the respective one of the plurality of input images is 0.7 times of the length of the line connecting the left shoulder feature point and right shoulder feature point of the user sub-image. Alternatively, the height of the sub-region of the user sub-image of the respective one of the plurality of input images is 0.8 times of the length of the line connecting the left shoulder feature point and right shoulder feature point of the user sub-image. Alternatively, the height of the sub-region of the user sub-image of the respective one of the plurality of input images is 0.9 times of the length of the line connecting the left shoulder feature point and right shoulder feature point of the user sub-image.

In some embodiments, in the process of searching for the gaze position in the sub-region, subsequent to defining the sub-region of the user sub-image using the sub-set of the user feature points, the gaze position is searched within the sub-region of the user sub-image to determine eye status. Optionally, the eye status includes the presence of the gaze position, and absence of the gaze position.

Figure 2B:
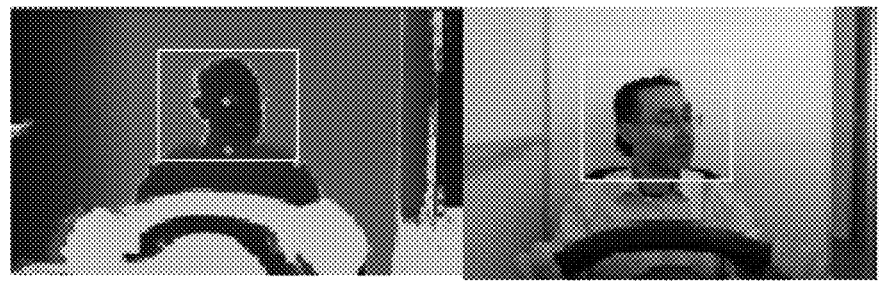
FIG. 2B is a schematic diagram of determining presence or absence of a gaze position in a sub-region of a user sub-image in some embodiments according to the present disclosure.

FIG. 2B is a schematic diagram of determining presence or absence of a gaze position in a sub-region of a user sub-image in some embodiments according to the present disclosure. Referring to FIG. 2B, subsequent to searching the gaze position in the sub-region of the user sub-image, the presence or absence of the gaze position is determined. In one example, when the user closes his eyes, the gaze position is absent in the sub-region of the user sub-image. In another example, when the user opens his eyes, the gaze position is present in the sub-region of the user sub-image.

In some embodiments, the computer-implemented method of processing an image includes determining whether the user is at a to-be-alerted status base on one or a combination of the user status and eye status.

In some embodiments, the to-be-alerted status are based on the user status. Optionally, determining whether the user is at the to-be-alerted status includes determining whether the user status of the plurality of input images satisfies a user status requirement. In one example, when the upper body of the user (e.g. the driver) is leaning for a time period, it can be determined that the user having that leaning posture is at the to-be-alerted status. In another example, when the user's hands (e.g. the drive's hands) are off the driving wheel for a time period, it can be determined that the user having hands off the driving wheel is at the to-be-alerted status.

In some embodiments, the to-be-alerted status can be determined based on the eye status. Optionally, determining whether the user is at the to-be-alerted status includes determining whether the eye status satisfy an eye status requirement. In one example, when the user (e.g. the driver) frequently blink his eyes during a time period, it can be determined that the user frequently blinking his eyes is at the to-be-alerted status. In another example, when the user (e.g. the driver) closes his eyes for a time period, it can be determined that the user closing his eyes is at the to-be-alerted status.

Optionally, the to-be-alerted status is determined based on both the user status and the eye status. Optionally, determining whether the user is at the to-be-alerted status includes determining whether the user status of the plurality of input image satisfies the user status requirement; and determining whether the eye status of the plurality of input images satisfies the eye status requirement. In one example, when the upper body of the user (e.g. the driver) is leaning for a time period, and the user (e.g. the driver) frequently blink his eyes in the same time period, it can be determined that the user is at the to-be-alerted status. In another example, when the user's hands (e.g. the drive's hands) are off the driving wheel for a time period, and the user (e.g. the driver) closes his eyes for the same time period, it can be determined that the user is at the to-be-alerted status.

In some embodiments, the user status requirement can be that a first percentage of the plurality of input images obtained during a time interval determined to be a second type is greater than a first threshold value.

Optionally, the types of user status include at least two types of user status. For example, the types of user status a first type and the second type. For example, the first type is a normal driving type. The second type is an abnormal driving type. Optionally, the types of user status include more than two types. For example, the types of user status include a normal driving type, a driving type with hands on the driving wheel, a driving type with hands off the driving wheel, a driving type with normal seated driver, a driving type with abnormal seated driver, a fatigue driving type, and a distracted driver type.

Optionally, the first threshold value is 60%. For example, the number of the plurality of input images during the time interval is 10. The first percentage of the plurality of input images obtained during the time interval determined to be the second type 70%, the user is in at the to-be-alerted status.

In some embodiments, the user status requirement can be that a first number of the plurality of input images obtained during the time interval determined to be the second type is greater than the first threshold value. Optionally, the first threshold value is 6. For example, the number of the plurality of input images during the time interval is 10. The first number of the plurality of input images obtained during the time interval determined to be the second type is 7, the user is in at the to-be-alerted status.

In some embodiments, the eye status requirement is that a second percentage of the plurality of input images in absence of gaze position during the time interval is greater than a second threshold value. Optionally, the eye status requirement is that a second number of the plurality of input images in absence of gaze position during the time interval is greater than a second threshold value.

In some embodiments, the plurality of input images are a plurality of consecutive input images. By analyzing the plurality of consecutive input image obtained during the time interval, whether the user status of the plurality of input images satisfies the user status requirements and whether the eye status of the plurality of input images satisfies the eye status requirements can be determined, and whether the user is at the to-be-alerted status can be determined. Based on the determination of user at the to-be-alerted status, a driver alert signal can be given to the drive, which can prevent the driver from being in a dangerous driving situation.

In some embodiments, determining whether the user is at the to-be-alerted status based on one of a combination of user status and the eye status can improve the accuracy of the determination of the to-be-alerted status of the user, and help to give the driver alert signal in time, which can improve user experience.

Figure 3:
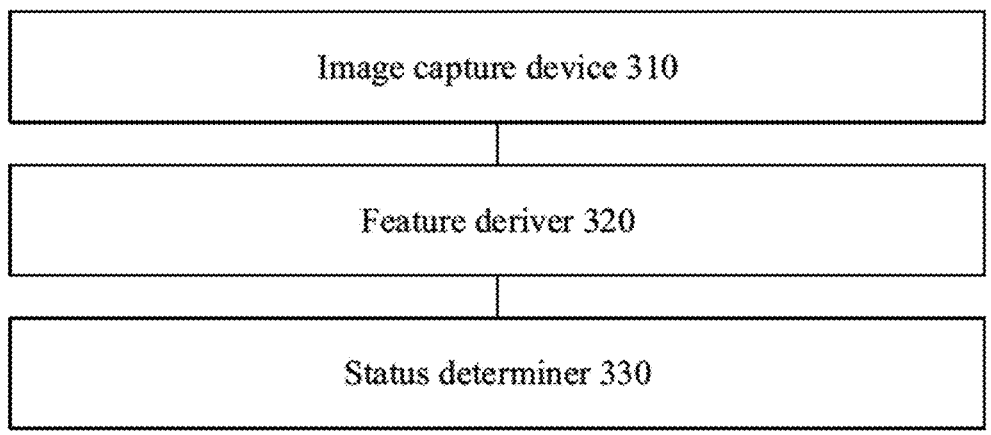
FIG. 3 is a schematic diagram of an apparatus for processing an image in some embodiments according to the present disclosure.

In another aspect, the present disclosure also provides an apparatus for processing an images. FIG. 3 is a schematic diagram of an apparatus for processing an image in some embodiments according to the present disclosure. Referring to FIG. 3, in some embodiments, the apparatus for processing an image using the computer implemented method described herein includes an image capture device 310 configured to obtain a plurality of input images. Optionally, a respective one of the plurality of input images includes a user sub-image and an object sub-image.

Optionally, the image capture device 310 includes an image capture sub-device configured to obtain a plurality of consecutive input images during a time interval. A respective one of the plurality of consecutive input images includes a user sub-image and an object sub-image.

In some embodiments, the apparatus further includes a feature deriver 320 configured to derive user features in the user sub-image of the respective one of the plurality of input images; and derive object features in the object sub-image of the respective one of the plurality of input images.

Optionally, the feature deriver 320 includes a feature sub-deriver configured to derive user feature points in the user sub-image of the respective one of the plurality of input images using a first classifier; and derive object feature points in the object sub-image of the respective one of the plurality of input images using the first classifier.

Optionally, the feature deriver 320 further includes a first classifier trainer configured to pre-train the first initial classifier to obtain the first classifier using the plurality of first training images, training user feature points of user sub-images of the plurality of first training images, and training object feature points of object sub-images of the plurality of first training images. Optionally, the first classifier is a random forest classifier.

In some embodiments, the apparatus further includes a status determiner 330 configured to classify user status in the respective one of the plurality of consecutive input images by analyzing the user feature points and the object feature points.

Optionally, the status determiner 330 is configured to determine user status of the respective one of the plurality of input images based on the user feature points in the user sub-image of the respective one of the plurality of input images and the object features in the object sub-image of the respective one of the plurality of input images using a second classifier.

Optionally, the status determiner 330 further includes a second classifier trainer configured to pre-train the second initial classifier to obtain the second classifier base on the plurality of second training images, training classified types respectively for the plurality of second training images, training user feature points of user sub-images of the plurality of second training images, and training object feature points of object sub-images of the plurality of second training images. Optionally, the second classifier is a convolutional neural network.

Optionally, the status determiner 330 further includes an eye status determiner configured to determining presence or absence of a gaze position by using a sub-set of the user feature points to define a sub-region and searching for the gaze position in the sub-region. Optionally, the gaze position searcher includes a sub-region definer, and a gaze position searcher. In one example, the sub-region definer is configured to define the sub-region based on the sub-set of the user feature points of the user sub-image of the respective one of the plurality of input images. In another example, the gaze position searcher is configured to search the gaze position in the sub-region to determine the eye status.

In some embodiments, the apparatus further includes a condition satisfaction determiner, and a to-be-alerted status determiner. Optionally, the condition satisfaction determiner is configured to determining whether the user status of the plurality of input images satisfies the user status of the plurality of input images requirement and determining whether the eye status of the plurality of input images satisfies the eye status requirement. Optionally, the to-be-alerted status determiner is configured to determine whether the user is at the to-be-alerted status based on the result determined by condition satisfaction determiner, concerning whether the user status of the plurality of input images satisfies the user status requirement and determining whether the eye status of the plurality of input image satisfies the eye status requirement.

In some embodiments, the apparatus further includes a driver alert signal provider configured to generating a driver alert signal when the user is at a to-be-alerted status.

By analyzing the user sub-image and the object sub-image of the respective one of the plurality of the input images, the user status of the respective one of the plurality of input images can be determined. Separating the user sub-image from the object sub-image can avoid the interference of the object on the analysis of the user sub-image, which may reduce the error rate and enhance the accuracy of the analysis.

In some embodiments, the apparatus for processing an image using the computer-implemented method described herein includes a memory, and one or more processors. Optionally, the memory and the one or more processor are connected with each other.

In some embodiments, the memory stores computer-executable instruction for controlling the one or more processors to obtain a plurality of input images. Optionally, a respective one of the plurality of input images includes a user sub-image and an object sub-image. Optionally, the plurality of input images are a plurality of consecutive input images during a time interval.

Optionally, the memory stores computer-executable instruction for controlling the one or more processors to derive user features in the user sub-image of the respective one of the plurality of input images, and to derive object features in the object sub-image of the respective one of the plurality of input images.

Optionally, the memory stores computer-executable instruction for controlling the one or more processors to classify user posture in the respective one of the plurality of consecutive input images by analyzing the user feature points and the object feature points.

Figure 4:
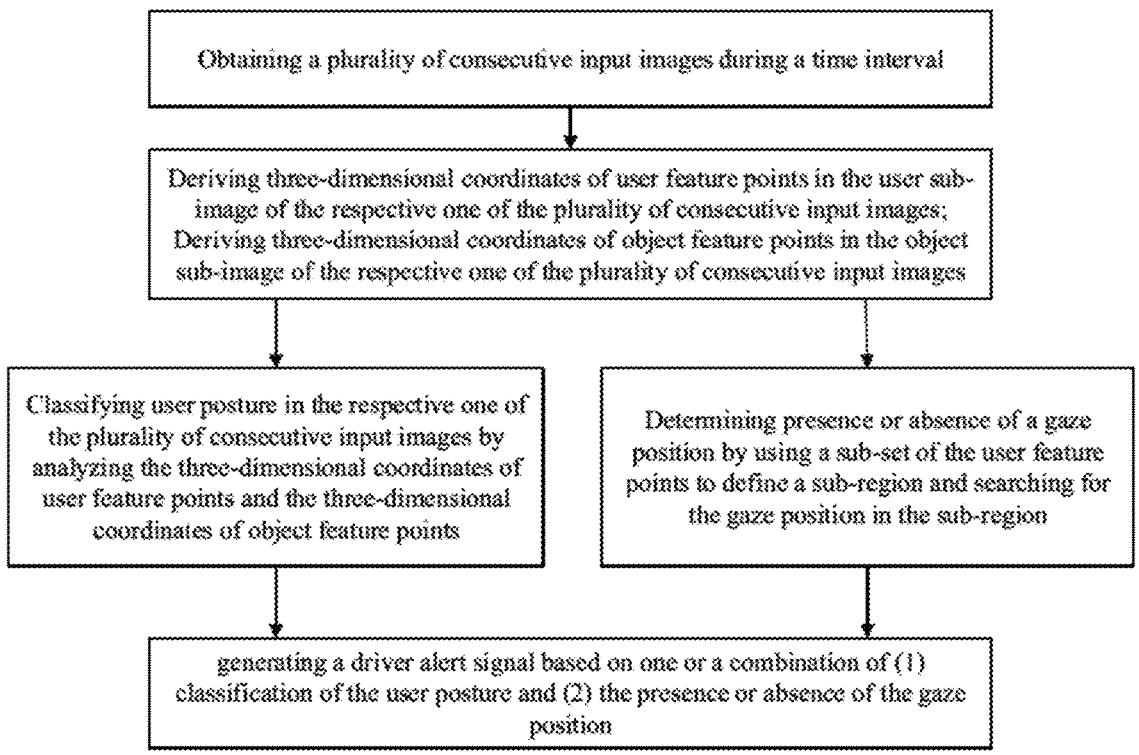
FIG. 4 is a flow chart illustrating a computer-implemented method of alerting a driver of a vehicle in some embodiments according to the present disclosure.

In another aspect, the present disclosure also disclosure a computer-implemented method of alerting the driver of the vehicle. FIG. 4 is a flow chart illustrating a computer-implemented method of alerting the driver of the vehicle in some embodiments according to the present disclosure. Referring to FIG. 4, in some embodiments, the computer-implemented method of alerting the driver of the vehicle includes obtaining a plurality of consecutive input images during a time interval using a three-dimensional depth camera. Optionally, a respective one of the plurality of consecutive input images includes a user sub-image and an object sub-image. In one example, the user sub-image includes an image of an upper body of the driver. In another example, the object sub-image includes an image of a driving wheel of the vehicle.

Optionally, the plurality of consecutive input images are obtained during a time interval using a three-dimensional depth camera, e.g. an RGB-D camera. Various types of three-dimensional depth cameras can be used for obtaining the plurality of consecutive input images. Examples of types of three-dimensional depth cameras include, but are not limited to a type of cameras based on structured light, a type of cameras based on time of flight (TOF), and a type of cameras based on stereo system. Optionally, the plurality of input images are obtained during a time interval using a camera other than a three-dimensional depth camera.

Optionally, the user sub-image includes an image of an upper body of the driver. Optionally, the object sub-image includes an image of an object in contact with the user, for example, an image of a driving wheel of the vehicle.

In some embodiments, the computer-implemented method of alerting the driver of the vehicle includes deriving three-dimensional coordinates of user feature points in the user sub-image of the respective one of the plurality of consecutive input images using a first classifier; and deriving three-dimensional coordinates of object feature points in the object sub-image of the respective one of the plurality of consecutive input images using the first classifier.

Optionally, the user feature points includes user's joint points. Referring to FIG. 2A, for example, the user feature points include, but are not limited to, a right hand feature point, a left hand feature point, a right elbow feature point, a left elbow feature point, a right shoulder feature point, a left shoulder figure point, a head feature point, a neck feature point, and a middle spine feature point.

Optionally, the object feature points includes structural points of the object. For example, the training object feature points include, but are not limited to, a leftmost driving wheel feature point, a second to the leftmost driving wheel feature point, a third to the leftmost driving wheel feature point, a center driving wheel feature point, a third to the rightmost driving wheel feature point, a second to the rightmost driving wheel feature point, and a rightmost driving wheel feature point, which are arranged along a clockwise direction or a counter clockwise direction. Optionally, the object feature points are evenly distributed in the are part of the driving wheel along a clockwise direction or a counter clockwise direction.

Various appropriate classifier may be used as the first classifier. Examples of classifier suitable to be used as the first classifier include, but are not limited to, classifiers based on machine learning such as a random forest classifier, a convolutional neural network, an Adaboost classifier, and an SVM classifier.

Optionally, the decision tree classifier can be used for deriving three-dimensional coordinates of user feature points in the user sub-image of the respective one of the plurality of consecutive input images. For example, the random forest classifier can be used for deriving the three-dimensional coordinates of user feature points in the user sub-image of the respective one of the plurality of consecutive input images.

Figure 5:
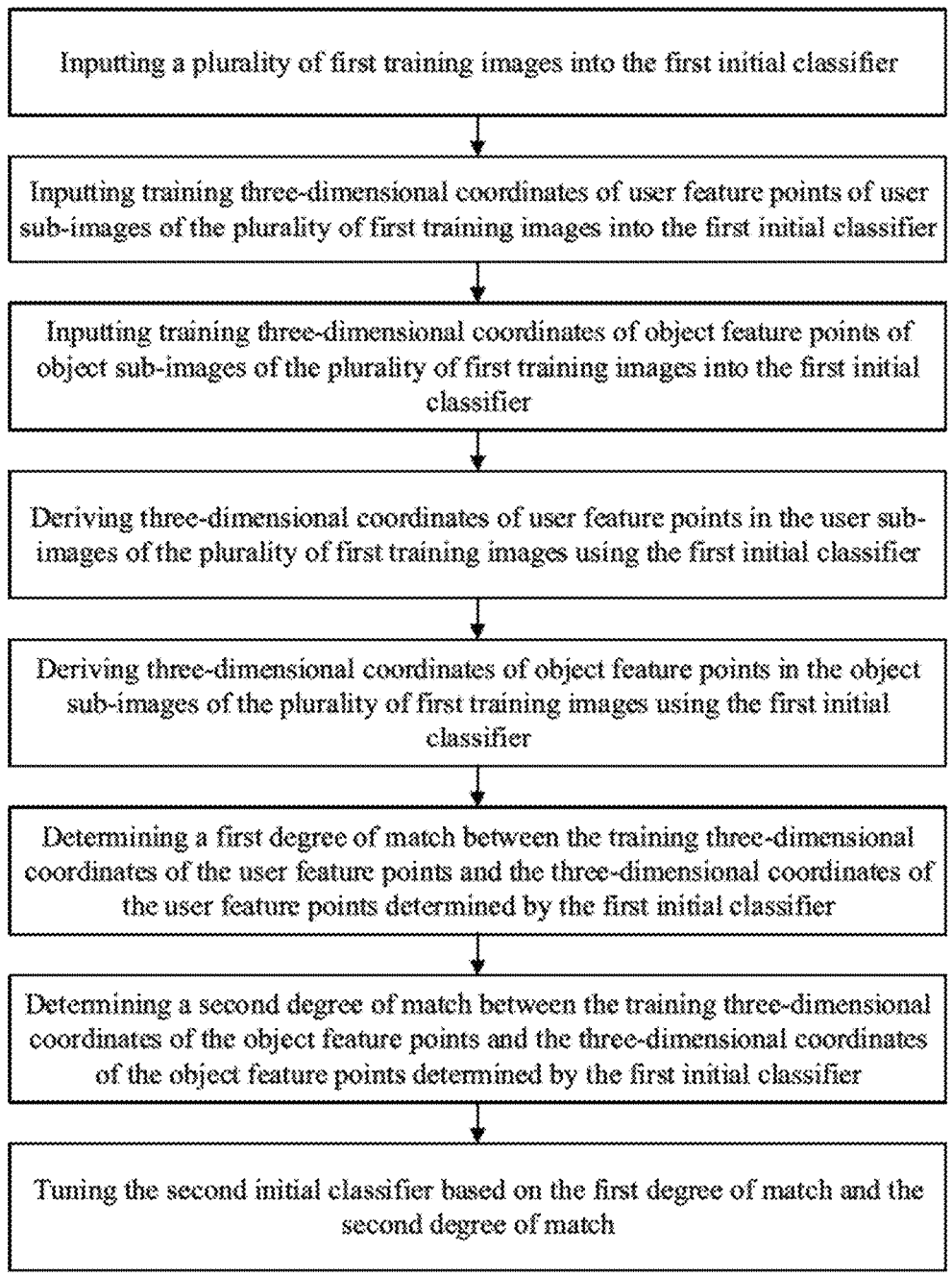
FIG. 5 is a flow chart illustrating a computer-implemented method of pre-training a first initial classifier to obtain a first classifier in some embodiments according to the present disclosure.

FIG. 5 is a flowchart illustrating a computer-implemented method of pre-training a first initial classifier to obtain a first classifier in some embodiments according to the present disclosure. Referring to FIG. 5, in some embodiments, the computer-implemented method of processing the image includes pre-training a first initial classifier to obtain the first classifier. Optionally, pre-training the first initial classifier includes inputting a plurality of first training images into the first initial classifier, a respective one of the plurality of first training images including a user sub-image and an object sub-image; inputting training three-dimensional coordinates of user feature points of user sub-images of the plurality of first training images into the first initial classifier; inputting training three-dimensional coordinates of object feature points of object sub-images of the plurality of first training images into the first initial classifier; deriving three-dimensional coordinates of user feature points in the user sub-images of the plurality of first training images using the first initial classifier; deriving three-dimensional coordinates of object feature points in the object sub-images of the plurality of first training images using the first initial classifier; determining a first degree of match between the training three-dimensional coordinates of the user feature points and the three-dimensional coordinates of the user feature points determined by the first initial classifier; determining a second degree of match between the training three-dimensional coordinates of the object feature points and the three-dimensional coordinates of the object feature points determined by the first initial classifier; tuning the first initial classifier based on the first degree of match and the second degree of match.

Optionally, the plurality of first training images are obtained by three-dimensional depth cameras installed in vehicles (e.g. cars). Optionally, a respective one of the plurality of first training images includes an image of an upper body of a driver. Optionally, the training user feature points of user sub-images and the training object feature points of object sub-images of the plurality of first training images is manually derived.

Optionally, the plurality of first training images are obtained from industry-wide databases, including Motor-Mark databases.

Optionally, the number of the plurality of first training images is determined by the user. For example, the number of the plurality of first training images is 100, 130, 200, or etc. The greater the number of the plurality of first training images is, the more accurate the first classifier is.

Optionally, the plurality of first training images are standard images subject to the requirement of the first classifier. Optionally, subsequent to selecting the plurality of first training images from a training images database, the training three-dimensional coordinates of the user feature points of the user sub-image of the respective one of the plurality of first training images are derived, and the training three-dimensional coordinates of the object feature points of the object sub-image of the respective one of the plurality of first training images are derived. Optionally, the training three-dimensional coordinates of the user feature points and the training three-dimensional coordinates of the object feature points are derived based on conventional knowledge or based on cluster analysis.

Referring to FIG. 2A, optionally, the training user feature points include, but are not limited to, a right hand feature point, a left hand feature point, a right elbow feature point, a left elbow feature point, a right shoulder feature point, a left shoulder figure point, a head feature point, a neck feature point, and a middle spine feature point.

Optionally, the training object feature points include, but are not limited to, a leftmost driving wheel feature point, a second to the leftmost driving wheel feature point, a third to the leftmost driving wheel feature point, a center driving wheel feature point, a third to the rightmost driving wheel feature point, a second to the rightmost driving wheel feature point, and a rightmost driving wheel feature point, which are arranged along a clockwise direction or a counter clockwise direction. Optionally, the object feature points are evenly distributed in the arc part of the driving wheel along a clockwise direction or a counter clockwise direction.

In some embodiment, the first initial classifier is a random forest classifier. In the process of pre-training the first initial classifier (e.g. the random forest classifier), subsequent to derive the training three-dimensional coordinates of user feature points of user sub-images of the plurality of first training images and the training three-dimensional coordinates of the object feature points of object sub-images of the plurality of first training images, the plurality of first training images are input in the first initial classifier (e.g. the random forest classifier), a decision tree is formed based on the training three-dimensional coordinates of the user feature points of user sub-images of the plurality of first training images and the training three-dimensional coordinates of the object feature points of object sub-images of the plurality of first training images. Repeating the process of forming the decision tree to form more decision trees, to form multiple layers of decision trees, and to finally form a decision tree forest.

In some embodiments, referring to FIG. 4, the computer-implemented method of alerting the driver of the vehicle includes classifying user posture in the respective one of the plurality of consecutive input images by analyzing the three-dimensional coordinates of user feature points and the three-dimensional coordinates of object feature points using a second classifier.

Optionally, classifying the user posture includes classifying the user posture into a first type and a second type. For example, the first type is a normal driving type. The second type is an abnormal driving type.

Optionally, classifying the user posture includes classifying the user posture into more than two types. For example, the types of user postures include a normal driving type, a driving type with hands on the driving wheel, a driving type with hands off the driving wheel, a driving type with normal seated driver, a driving type with abnormal seated driver, a fatigue driving type, and a distracted driver type.

Figure 6:
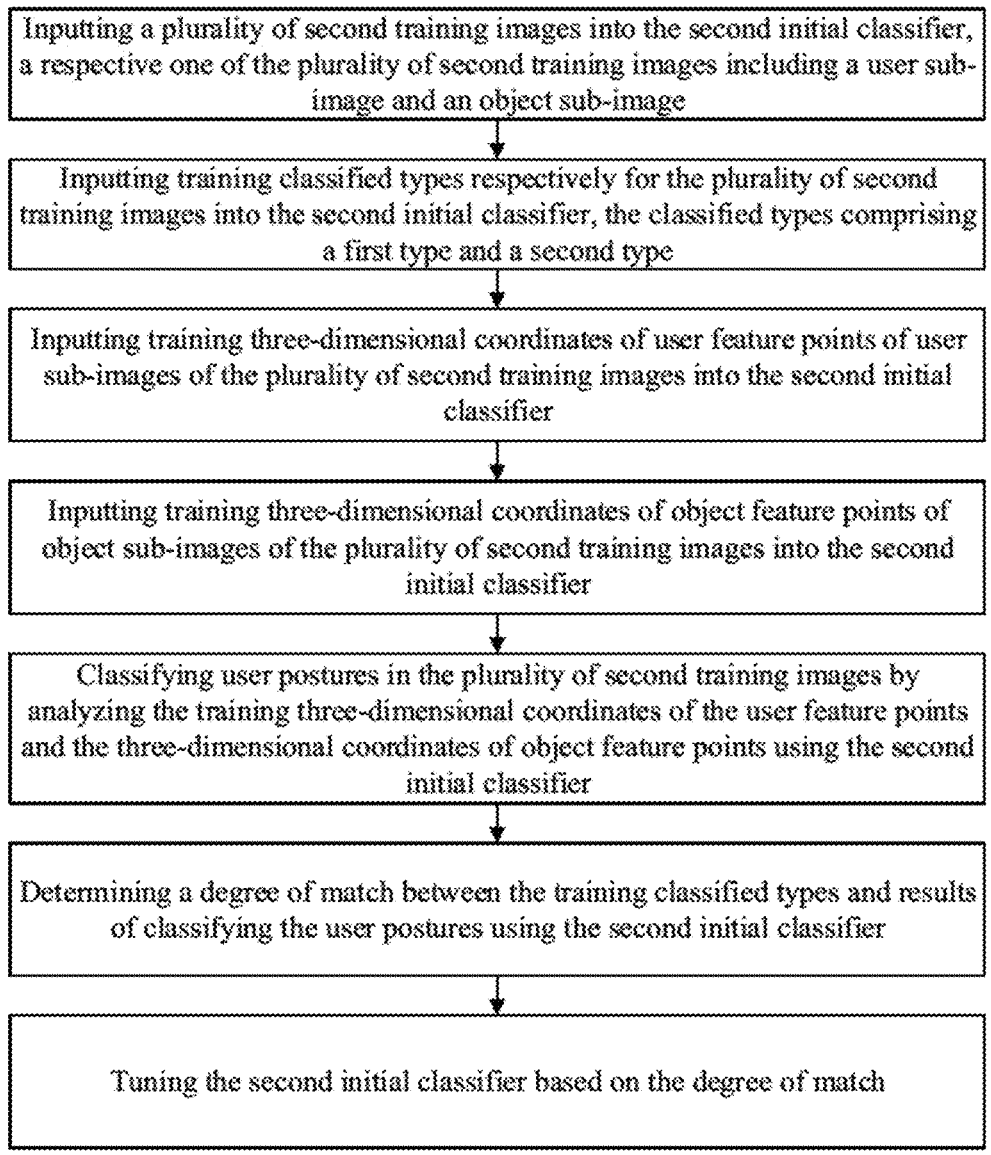
FIG. 6 is a flow chart illustrating a computer-implemented method of pre-training a second initial classifier to obtain a second classifier in some embodiments according to the present disclosure.

FIG. 6 is a flow chart illustrating a computer-implemented method of pre-training a second initial classifier to obtain a second classifier in some embodiments according to the present disclosure. Referring to FIG. 6, in some embodiments, pre-training the second initial classifier includes inputting a plurality of second training images into the second initial classifier. Optionally, a respective one of the plurality of second training images includes a user sub-image and an object sub-image.

In some embodiments, pre-training the second initial classifier includes inputting training classified types respectively for the plurality of second training images into the second initial classifier, the classified types includes the first type and the second type; inputting training three-dimensional coordinates of user feature points of user sub-images of the plurality of second training images into the second initial classifier; inputting training three-dimensional coordinates of object feature points of object sub-images of the plurality of second training images into the second initial classifier, classifying user postures in the plurality of consecutive input images by analyzing the training three-dimensional coordinates of the user feature points and the three-dimensional coordinates of object feature points using the second initial classifier to have results of classifying the user postures; determining a degree of match between the training classified types and results of classifying the user postures using the second initial classifier; and tuning the second initial classifier based on the degree of match.

Various appropriate classifier may be used as the second classifier. Examples of classifier suitable to be used as the second classifier include, but are not limited to, classifiers based on machine learning such as a random forest classifier, a convolutional neural network, an Adaboost classifier, an SVM classifier, a kNN classifier, and a k-means classifier.

Various appropriate neural networks can be used as the second classifier. Example of neural networks suitable to be used as the second classifier includes convolutional neural networks, deep neural networks, and shallow neural network.

In some embodiments, the second classifier is a convolutional neural network. Optionally, the training three-dimensional coordinates of user feature points of the user sub-image of the respective one of the plurality of second training images and the training three-dimensional coordinates of object feature points of the object sub-image of the respective one of the plurality of second training images, training classified types respectively for the plurality of second training images form feature vector matrixes of the respective one of the plurality of second training images. The feature vector matrixes of the respective one of the plurality of second training images are input into the second initial classifier (e.g. the convolutional neural network). Optionally, the second initial classifier (e.g. the convolutional neural network) outputs a respective type of user posture of the respective one of the plurality of second training images. So, the second classifier obtained through training the second initial classifier can classify the type of user posture of a respective one of the plurality of input images.

Optionally, the plurality of second training images are obtained by three-dimensional depth cameras installed in vehicles (e.g. cars). Optionally, a respective one of the plurality of second training images includes an image of an upper body of a driver. Optionally, the training user feature points of user sub-images and the training object feature points of object sub-images of the plurality of second training images is manually derived.

Optionally, the plurality of second training images are obtained from industry-wide databases, including Motor-Mark databases.

Optionally, the number of the plurality of second training images is determined by the user. For example, the number of the plurality of second training images is 100, 200, 300, or etc. The greater the number of the plurality of second training images is, the more accurate the second classifier is.

In some embodiments, the plurality of first training images respectively corresponds to the plurality of second training images. Optionally, the plurality of first training images are used as the plurality of second training images. For example, the plurality of first training image can be used to train the first classifier, and can also be used to train the second classifier as well.

In some embodiments, referring to FIG. 4, the computer-implemented method of alerting the driver of the vehicle includes determining presence or absence of a gaze position by using a sub-set of the user feature points to define a sub-region and searching for the gaze position in the sub-region.

In some embodiments, using the sub-set of the user features points of the user sub-image of the respective one of the plurality of input images to define the sub-region of the user sub-image of the respective one of the plurality of input images can reduce the scope of searching the gaze position and enhance the efficiency of searching the gaze position.

Optionally, determining the presence or absence of the gaze position includes using the sub-set of the user feature points from a group consisting of a head feature point, a right shoulder feature point, a left shoulder feature point to define the sub-region and searching for the gaze position in the sub-region.

Optionally, the sub-region of the user sub-image of the respective one of the plurality of input images can be defined based on the left shoulder feature point and right shoulder feature point derived from the user sub-image.

In one example, the sub-region of the user sub-image of the respective one of the plurality of input images is a region above a line connecting the left shoulder feature point and right shoulder feature point of the user sub-image.

In another example, the sub-region of the user sub-image of the respective one of the plurality of input images has a rectangular shape. A width of the sub-region of the user sub-image of the respective one of the plurality of input images substantially coincident with the line connecting the left shoulder feature point and right shoulder feature point of the user sub-image. The height of the sub-region of the user sub-image of the respective one of the plurality of input images is in a range of 0.6 times to 1.2 times of a length of the line connecting the left shoulder feature point and right shoulder feature point of the user sub-image. Alternatively, the height of the sub-region of the user sub-image of the respective one of the plurality of input images is 0.7 times of the length of the line connecting the left shoulder feature point and right shoulder feature point of the user sub-image. Alternatively, the height of the sub-region of the user sub-image of the respective one of the plurality of input images is 0.8 times of the length of the line connecting the left shoulder feature point and right shoulder feature point of the user sub-image. Alternatively, the height of the sub-region of the user sub-image of the respective one of the plurality of input images is 0.9 times of the length of the line connecting the left shoulder feature point and right shoulder feature point of the user sub-image.

In some embodiments, determining the presence or absence of the gaze position includes searching for the gaze position in the sub-region. For example, subsequent to defining the sub-region of the user sub-image using the sub-set of the user feature points, the gaze position is searched within the sub-region of the user sub-image.

Referring to FIG. 2B, subsequent to searching the gaze position in the sub-region of the user sub-image, the presence or absence of the gaze position is determined. In one example, when the user closes his eyes, the gaze position is absent in the sub-region of the user sub-image. In another example, when the user opens his eyes, the gaze position is present in the sub-region of the user sub-image.

In some embodiments, the computer-implemented method of alerting the driver of the vehicle includes generating a driver alert signal based on one or a combination of (1) classification of the user posture and (2) the presence or absence of the gaze position.

In some embodiments, the driver alert signal is generated based on a determination that a first percentage of the plurality of consecutive input images obtained during the time interval determined to be the second type of user posture is greater than a first threshold value.

In one example, when the upper body of the user (e.g. the driver) is leaning in the respective one of the plurality of consecutive input images, the respective one of the consecutive input images is classified to have the second type user posture. In another example, when the user's hands (e.g. the drive's hands) are off the driving wheel in the respective one of the plurality of consecutive input images, the respective one of the consecutive input images is classified to have the second type user posture.

For example, the first threshold value is 60%. The first percentage of the plurality of consecutive input images obtained during the time interval determined to be the second type is greater than 60% (e.g. the first threshold value), the driver alert signal should be generated.

In some embodiments, the driver alert signal is generated based on a determination that the gaze position is absent in a second percentage of the plurality of consecutive input images obtained during the time interval. Optionally, the second percentage is greater than a second threshold value.

For example, the second threshold value is 70%, the second percentage of the plurality of consecutive input images obtained during the time interval having absent gaze position is greater than 70% (e.g. the second threshold value), the driver alert signal should be generated.

In some embodiments, the driver alert signal is generated based on a determination that (1) a first percentage of the plurality of consecutive input images obtained during the time interval determined to be the second type of user posture is greater than a first threshold value; and (2) the gaze position is absent in a second percentage of the plurality of consecutive input images obtained during the time interval, the second percentage being greater than a second threshold value.

In another aspect, the present disclosure also provides an apparatus for alerting a driver of a vehicle. In some embodiments, the apparatus for alerting the driver of the vehicle includes an image capturing device configured to obtaining a plurality of consecutive input images during a time interval using a three-dimensional depth camera. Optionally, a respective one of the plurality of consecutive input images includes a user sub-image and an object sub-image.

In some embodiments, the apparatus for alerting the driver of the vehicle includes a memory; and one or more processors. Optionally, the memory and the one or more processors are connected with each other. Optionally, the memory stores computer-executable instructions for controlling the one or more processors to derive three-dimensional coordinates of user feature points in the user sub-image of the respective one of the plurality of consecutive input images using a first classifier; derive three-dimensional coordinates of object feature points in the object sub-image of the respective one of the plurality of consecutive input images using the first classifier, classify user posture in the respective one of the plurality of consecutive input images by analyzing the three-dimensional coordinates of user feature points and the three-dimensional coordinates of object feature points using a second classifier, determine presence or absence of a gaze position by using a sub-set of the user feature points to define a sub-region and searching for the gaze position in the sub-region; and generate a driver alert signal based on one or a combination of (1) classification of the user posture and (2) the presence or absence of the gaze position.

Optionally, the memory stores computer-executable instructions for controlling the one or more processors to classify the user posture into a first type and a second type; and generate the driver alert signal is based on a determination that a first percentage of the plurality of consecutive input images obtained during the time interval determined to be the second type is greater than a first threshold value.

Optionally, the memory stores computer-executable instructions for controlling the one or more processors to generate the driver alert signal based on a determination that the gaze position is absent in a second percentage of the plurality of consecutive input images obtained during the time interval, the second percentage being greater than a second threshold value.

Optionally, the memory stores computer-executable instructions for controlling the one or more processors to classify the user posture into a first type and a second type; and generate the driver alert signal is based on a determination that (1) a first percentage of the plurality of consecutive input images obtained during the time interval determined to be the second type is greater than a first threshold value; and (2) the gaze position is absent in a second percentage of the plurality of consecutive input images obtained during the time interval, the second percentage being greater than a second threshold value.

Optionally, the memory stores computer-executable instructions for controlling the one or more processors to determine the presence or absence of the gaze position using the sub-set of the user feature points from a group consisting of a head feature point, a right shoulder feature point, a left shoulder feature point to define the sub-region and searching for the gaze position in the sub-region.

Optionally, the first classifier is selected from a group consisting of a random forest classifier, a convolutional neural network classifier, an Adaboost classifier, and an SVM classifier.

Optionally, the second classifier is selected from a group consisting of a random forest classifier, a convolutional neural network, an Adaboost classifier, and an SVM classifier.

Optionally, the user sub-image includes an image of an upper body of the driver and the object sub-image includes an image of a driving wheel of the vehicle.

In another aspect, the present disclosure also provides a vehicle includes the apparatus described herein.

In another aspect, the present disclosure also provides a computer-program product. In some embodiments, the computer-program product includes anon-transitory tangible computer-readable medium having computer-readable instructions thereon.

Optionally, the computer-readable instructions are executable by a processor to cause the processor to perform deriving three-dimensional coordinates of user feature points in a user sub-image of a respective one of a plurality of consecutive input images using a first classifier, the plurality of consecutive input images being obtained during a time interval using a three-dimensional depth camera, the respective one of the plurality of consecutive input images including the user sub-image and an object sub-image; deriving three-dimensional coordinates of object feature points in the object sub-image of the respective one of the plurality of consecutive input images using the first classifier, classifying user posture in the respective one of the plurality of consecutive input images by analyzing the three-dimensional coordinates of user feature points and the three-dimensional coordinates of object feature points using a second classifier; determining presence or absence of a gaze position by using a sub-set of the user feature points to define a sub-region and searching for the gaze position in the sub-region; and generating a driver alert signal based on one or a combination of (1) classification of the user posture and (2) the presence or absence of the gaze position.

Various illustrative neural networks, classifiers, derivers, determiners, segments, units, channels, modules, and other operations described in connection with the configurations disclosed herein may be implemented as electronic hardware, computer software, or combinations of both. Such neural networks, classifiers, derivers, determiners, segments, units, channels, modules may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method of alerting a driver of a vehicle, comprising:
    obtaining a plurality of consecutive input images during a time interval using a three-dimensional depth camera, a respective one of the plurality of consecutive input images comprising a user sub-image and an object sub-image;
    deriving three-dimensional coordinates of user joint points in the user sub-image of the respective one of the plurality of consecutive input images using a first classifier;
    deriving three-dimensional coordinates of object feature points in the object sub-image of the respective one of the plurality of consecutive input images using the first classifier;
    classifying user posture in the respective one of the plurality of consecutive input images by analyzing the three-dimensional coordinates of user joint points and the three-dimensional coordinates of object feature points using a second classifier;
    determining presence or absence of a gaze position by using three-dimensional coordinates of a sub-set of the user joint points comprising a right shoulder joint point and a left shoulder joint point to define a sub-region and searching for the gaze position in the sub-region; and
    generating a driver alert signal based on one or a combination of (1) classification of the user posture and (2) the presence or absence of the gaze position.

2. The computer-implemented method of claim 1, wherein classifying the user posture comprises classifying the user posture into a first type and a second type; and
    wherein generating the driver alert signal is based on a determination that a first percentage of the plurality of consecutive input images obtained during the time interval determined to be the second type is greater than a first threshold value.

3. The computer-implemented method of claim 1, wherein generating the driver alert signal is based on a determination that the gaze position is absent in a second percentage of the plurality of consecutive input images obtained during the time interval, the second percentage being greater than a second threshold value.

4. The computer-implemented method of claim 1, wherein classifying the user posture comprises classifying the user posture into a first type and a second type;
    generating the driver alert signal is based on a determination that (1) a first percentage of the plurality of consecutive input images obtained during the time interval determined to be the second type is greater than a first threshold value; and (2) the gaze position is absent in a second percentage of the plurality of consecutive input images obtained during the time interval, the second percentage being greater than a second threshold value.

5. The computer-implemented method of claim 1, wherein a boundary of the sub-region is defined by a line connecting the left shoulder joint point and right shoulder joint point of the user sub-image; and
    a height of the sub-region is in a range of 0.6 times to 1.2 times of a length of the line connecting the left shoulder joint point and right shoulder joint point of the user sub-image.

6. The computer-implemented method of claim 1, further comprising pre-training a first initial classifier to obtain the first classifier;
    wherein pre-training the first initial classifier comprises:
    inputting a plurality of first training images into the first initial classifier, a respective one of the plurality of first training images comprising a user sub-image and an object sub-image;
    inputting training three-dimensional coordinates of user joint points of user sub-images of the plurality of first training images into the first initial classifier;
    inputting training three-dimensional coordinates of object feature points of object sub-images of the plurality of first training images into the first initial classifier;
    deriving three-dimensional coordinates of user joint points in the user sub-images of the plurality of first training images using the first initial classifier;
    deriving three-dimensional coordinates of object feature points in the object sub-images of the plurality of first training images using the first initial classifier;
    determining a first degree of match between the training three-dimensional coordinates of the user joint points and the three-dimensional coordinates of the user joint points determined by the first initial classifier;
    determining a second degree of match between the training three-dimensional coordinates of the object feature points and the three-dimensional coordinates of the object feature points determined by the first initial classifier; and
    tuning the first initial classifier based on the first degree of match and the second degree of match.

7. The computer-implemented method of claim 1, further comprising pre-training a second initial classifier to obtain the second classifier;
    wherein pre-training the second initial classifier comprises:
    inputting a plurality of second training images into the second initial classifier, a respective one of the plurality of second training images comprising a user sub-image and an object sub-image;
    inputting training classified types respectively for the plurality of second training images into the second initial classifier, the classified types comprising a first type and a second type;
    inputting training three-dimensional coordinates of user joint points of user sub-images of the plurality of second training images into the second initial classifier;
    inputting training three-dimensional coordinates of object feature points of object sub-images of the plurality of second training images into the second initial classifier;
    classifying user postures in the plurality of second training images by analyzing the training three-dimensional coordinates of the user joint points and the three-dimensional coordinates of object feature points using the second initial classifier;

determining a degree of match between the training classified types and results of classifying the user postures using the second initial classifier; and tuning the second initial classifier based on the degree of match.

8. The computer-implemented method of claim 1, wherein the first classifier is selected from a group consisting of a random forest classifier, a convolutional neural network classifier, an Adaboost classifier, and an SVM classifier.

9. The computer-implemented method of claim 1, wherein the second classifier is selected from a group consisting of a random forest classifier, a convolutional neural network classifier, Adaboost classifier, and an SVM classifier.

10. The computer-implemented method of claim 1, wherein the user sub-image comprises an image of an upper body of the driver and the object sub-image comprises an image of a driving wheel of the vehicle.

11. An apparatus for alerting a driver of a vehicle, comprising:

an image capturing device configured to obtaining a plurality of consecutive input images during a time interval using a three-dimensional depth camera, a respective one of the plurality of consecutive input images comprising a user sub-image and an object sub-image;

a memory;

one or more processors;

wherein the memory and the one or more processors are connected with each other; and the memory stores computer-executable instructions for controlling the one or more processors to:

derive three-dimensional coordinates of user joint points in the user sub-image of the respective one of the plurality of consecutive input images using a first classifier;

derive three-dimensional coordinates of object feature points in the object sub-image of the respective one of the plurality of consecutive input images using the first classifier;

classify user posture in the respective one of the plurality of consecutive input images by analyzing the three-dimensional coordinates of user joint points and the three-dimensional coordinates of object feature points using a second classifier;

determine presence or absence of a gaze position by using three-dimensional coordinates of a sub-set of the user joint points from a group consisting of a head feature point, a right shoulder joint point, a left shoulder joint point to define a sub-region and searching for the gaze position in the sub-region; and generate a driver alert signal based on one or a combination of (1) classification of the user posture and (2) the presence or absence of the gaze position.

12. The apparatus of claim 11, wherein the memory stores computer-executable instructions for controlling the one or more processors to classify the user posture into a first type and a second type; and generate the driver alert signal is based on a determination that a first percentage of the plurality of consecutive input images obtained during the time interval determined to be the second type is greater than a first threshold value.

13. The apparatus of claim 11, wherein the memory stores computer-executable instructions for controlling the one or more processors to generate the driver alert signal based on a determination that the gaze position is absent in a second percentage of the plurality of consecutive input images obtained during the time interval, the second percentage being greater than a second threshold value.

14. The apparatus of claim 11, wherein the memory stores computer-executable instructions for controlling the one or more processors to classify the user posture into a first type and a second type; and generate the driver alert signal is based on a determination that (1) a first percentage of the plurality of consecutive input images obtained during the time interval determined to be the second type is greater than a first threshold value; and (2) the gaze position is absent in a second percentage of the plurality of consecutive input images obtained during the time interval, the second percentage being greater than a second threshold value.

15. The apparatus of claim 11, wherein a boundary of the sub-region is defined by a line connecting the left shoulder joint point and right shoulder joint point of the user sub-image; and a height of the sub-region is in a range of 0.6 times to 1.2 times of a length of the line connecting the left shoulder joint point and right shoulder joint point of the user sub-image.

16. The apparatus of claim 11, wherein the first classifier is selected from a group consisting of a random forest classifier, a convolutional neural network classifier, an Adaboost classifier, and an SVM classifier.

17. The apparatus of claim 11, wherein the second classifier is selected from a group consisting of a random forest classifier, a convolutional neural network classifier, an Adaboost classifier, and an SVM classifier.

18. The apparatus of claim 11, wherein the user sub-image comprises an image of an upper body of the driver and the object sub-image comprises an image of a driving wheel of the vehicle.

19. A vehicle, comprising the apparatus of claim 11.

20. A computer-program product comprising a non-transitory tangible computer-readable medium having computer-readable instructions thereon, the computer-readable instructions being executable by a processor to cause the processor to perform:

deriving three-dimensional coordinates of user joint points in a user sub-image of a respective one of a plurality of consecutive input images using a first classifier, the plurality of consecutive input images being obtained during a time interval using a three-dimensional depth camera, the respective one of the plurality of consecutive input images comprising the user sub-image and an object sub-image;

deriving three-dimensional coordinates of object feature points in the object sub-image of the respective one of the plurality of consecutive input images using the first classifier;

classifying user posture in the respective one of the plurality of consecutive input images by analyzing the three-dimensional coordinates of user joint points and the three-dimensional coordinates of object feature points using a second classifier;

determining presence or absence of a gaze position by using three-dimensional coordinates of a sub-set of the user joint points comprising a right shoulder joint point and a left shoulder joint point to define a sub-region and searching for the gaze position in the sub-region; and generating a driver alert signal based on one or a combination of (1) classification of the user posture and (2) the presence or absence of the gaze position.

* * * * *